United States Patent
Lim et al.

(10) Patent No.: US 10,103,385 B2
(45) Date of Patent: Oct. 16, 2018

(54) ELECTRODE ASSEMBLY INCLUDING CATHODE AND ANODE HAVING DIFFERENT WELDING PORTION SHAPES AND SECONDARY BATTERY INCLUDING THE SAME

(71) Applicant: LG CHEM, LTD., Seoul (KR)

(72) Inventors: Soo Hyun Lim, Daejeon (KR); Seong Min Lee, Seoul (KR); Min Hee Lee, Suwon-si (KR); Jae Hyun Lee, Daejeon (KR); Daehong Kim, Daejeon (KR); Tae Jin Park, Daejeon (KR); Jihyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/464,403

(22) Filed: Aug. 20, 2014

(65) Prior Publication Data
US 2014/0356704 A1   Dec. 4, 2014

Related U.S. Application Data

(63) Continuation of application No. PCT/KR2013/003200, filed on Apr. 16, 2013.

(30) Foreign Application Priority Data

Apr. 16, 2012   (KR) .................. 10-2012-0039246
Apr. 16, 2012   (KR) .................. 10-2012-0039327
Apr. 16, 2012   (KR) .................. 10-2012-0039351

(51) Int. Cl.
*H01M 4/70*   (2006.01)
*H01M 2/26*   (2006.01)
(Continued)

(52) U.S. Cl.
CPC ............... *H01M 4/70* (2013.01); *H01M 2/26* (2013.01); *H01M 2/266* (2013.01); *H01M 4/131* (2013.01);
(Continued)

(58) Field of Classification Search
CPC ......... H01M 10/0525; H01M 10/0585; H01M 2220/30; H01M 2/26; H01M 2/266
(Continued)

(56) References Cited

U.S. PATENT DOCUMENTS 5,738,957 A    4/1998  Amine et al.
6,348,283 B1   2/2002  Mas et al.
(Continued)

FOREIGN PATENT DOCUMENTS

CN    101009372 A    8/2007
CN    201008000 Y    1/2008
(Continued)

OTHER PUBLICATIONS

International Search Report issued in PCT/KR2013/003200, dated Jul. 15, 2013.
(Continued)

*Primary Examiner* — Jonathan G Jelsma
*Assistant Examiner* — Rashid A Alam
(74) *Attorney, Agent, or Firm* — Birch, Stewart, Kolasch & Birch, LLP

(57) ABSTRACT

Disclosed is an electrode assembly including a plurality of alternately arranged cathode and anode plates, a separator interposed between the cathode plate and the anode plate, a plurality of cathode tabs respectively formed on the cathode plates, a plurality of anode tabs respectively formed on the anode plates, a cathode lead coupled to the cathode tabs, and an anode lead coupled to the anode tabs, wherein the welding portions in which the cathode and anode tabs are
(Continued)

respectively coupled to the cathode and anode leads have different shapes, or kinds of the cathode and anode tabs are identical and kinds of the cathode and anode leads are different.

18 Claims, 11 Drawing Sheets

(51) Int. Cl.
  H01M 4/131    (2010.01)
  H01M 4/485    (2010.01)
  H01M 4/505    (2010.01)
  H01M 4/525    (2010.01)
  H01M 10/0525  (2010.01)
  H01M 10/0585  (2010.01)
  H01M 4/58     (2010.01)

(52) U.S. Cl.
  CPC .......... *H01M 4/485* (2013.01); *H01M 4/505* (2013.01); *H01M 4/525* (2013.01); *H01M 4/5825* (2013.01); *H01M 10/0525* (2013.01); *H01M 10/0585* (2013.01); *H01M 2220/30* (2013.01); *Y02T 10/7011* (2013.01)

(58) Field of Classification Search
  USPC ........................................................ 429/211
  See application file for complete search history.

(56) References Cited

U.S. PATENT DOCUMENTS

| | | |
|---|---|---|
| 2002/0146620 A1 | 10/2002 | O'Connell |
| 2003/0170535 A1* | 9/2003 | Watanabe ............ H01M 2/0207 429/158 |
| 2003/0232243 A1 | 12/2003 | Hong |
| 2007/0172734 A1 | 7/2007 | Noguchi et al. |
| 2007/0190402 A1 | 8/2007 | Kumeuchi et al. |
| 2008/0044728 A1 | 2/2008 | Schmidt et al. |
| 2008/0060189 A1 | 3/2008 | Daidoji et al. |
| 2008/0070102 A1* | 3/2008 | Watanabe ............ H01M 2/1061 429/91 |
| 2008/0070115 A1 | 3/2008 | Saruwatari et al. |
| 2008/0102362 A1* | 5/2008 | Nii ...................... H01M 2/0212 429/161 |
| 2008/0118826 A1* | 5/2008 | Shimamura ............ H01M 6/48 429/129 |
| 2008/0219911 A1 | 9/2008 | Sun et al. |
| 2008/0292962 A1 | 11/2008 | Jung |
| 2009/0029264 A1* | 1/2009 | Nakazawa ............. H01M 4/131 429/322 |
| 2009/0169990 A1 | 7/2009 | Gardner et al. |
| 2009/0197162 A1* | 8/2009 | Shinyashiki ............ H01M 2/22 429/161 |
| 2009/0208816 A1 | 8/2009 | Viavattine et al. |
| 2010/0173178 A1 | 7/2010 | Kim et al. |
| 2010/0221595 A1 | 9/2010 | Murata |
| 2010/0266881 A1* | 10/2010 | You ..................... H01M 2/0277 429/56 |
| 2010/0323235 A1 | 12/2010 | Takami et al. |
| 2011/0027646 A1 | 2/2011 | Lee et al. |
| 2011/0070477 A1* | 3/2011 | Fujiwara .................. H01M 2/22 429/152 |
| 2011/0143180 A1 | 6/2011 | Han et al. |
| 2011/0165465 A1 | 7/2011 | Kim et al. |
| 2011/0171539 A1 | 7/2011 | Patoux et al. |
| 2012/0058379 A1 | 3/2012 | Kishi et al. |
| 2012/0121968 A1* | 5/2012 | Nakagawa ............. H01M 2/26 429/163 |
| 2012/0214049 A1* | 8/2012 | Iwamoto ................ H01G 9/008 429/178 |
| 2012/0244420 A1* | 9/2012 | Serizawa ................ H01M 2/02 429/163 |
| 2012/0270074 A1* | 10/2012 | Koh ..................... H01M 2/0212 429/7 |
| 2014/0356704 A1 | 12/2014 | Lim et al. |

FOREIGN PATENT DOCUMENTS

| | | |
|---|---|---|
| CN | 101154744 A | 4/2008 |
| CN | 101689629 A | 3/2010 |
| CN | 101911342 A | 12/2010 |
| CN | 102082290 A | 6/2011 |
| CN | 201918465 U | 8/2011 |
| CN | 201946701 U | 8/2011 |
| CN | 102244290 A | 11/2011 |
| CN | 202034444 U | 11/2011 |
| CN | 202094230 U | 12/2011 |
| CN | 102403529 A | 4/2012 |
| EP | 1 770 801 A1 | 4/2007 |
| JP | 7-16359 U | 3/1995 |
| JP | 7-240211 A | 9/1995 |
| JP | 8-298115 A | 11/1996 |
| JP | 2000-100434 A | 4/2000 |
| JP | 2001-243952 A | 9/2001 |
| JP | 2003-346779 A | 12/2003 |
| JP | 2004-79240 A | 3/2004 |
| JP | 2004-349109 A | 12/2004 |
| JP | 2005-149882 A | 6/2005 |
| JP | 2005-327656 A | 11/2005 |
| JP | 2007-26945 A | 2/2007 |
| JP | 2007-194208 A | 8/2007 |
| JP | 2007-227199 A | 9/2007 |
| JP | 2008-27831 A | 2/2008 |
| JP | 2008-27865 A | 2/2008 |
| JP | 2008-108477 A | 5/2008 |
| JP | 2010-267462 A | 11/2010 |
| JP | 2011-48967 A | 3/2011 |
| JP | 2011-81931 A | 4/2011 |
| JP | 2011-108534 A | 6/2011 |
| JP | 2011-526057 A | 9/2011 |
| JP | 2012-14935 A | 1/2012 |
| JP | 2012-38495 A | 2/2012 |
| JP | 2012-59457 A | 3/2012 |
| KR | 20-2000-0016884 U | 9/2000 |
| KR | 10-2004-0110921 A | 12/2004 |
| KR | 10-2005-0044771 A | 5/2005 |
| KR | 10-2007-0122370 A | 12/2007 |
| KR | 10-2008-0037197 A | 4/2008 |
| KR | 10-2008-0052869 A | 6/2008 |
| KR | 10-2008-0102606 A | 11/2008 |
| KR | 10-2008-0109948 A | 12/2008 |
| KR | 10-2010-0081508 A | 7/2010 |
| KR | 10-2010-0105634 A | 9/2010 |
| KR | 10-2010-0135382 A | 12/2010 |
| KR | 10-2011-0066632 A | 6/2011 |
| KR | 10-2011-0080827 A | 7/2011 |
| KR | 10-2011-0085018 A | 7/2011 |
| WO | WO 2008/002024 A1 | 1/2008 |
| WO | WO 2011/002064 A1 | 1/2011 |
| WO | WO 2011/111556 A1 | 9/2011 |
| WO | WO 2012/009129 A1 | 1/2012 |
| WO | WO 2013/157823 A1 | 10/2013 |

OTHER PUBLICATIONS

Chinese Office Action for Application 201380010405.7 with English translation dated Nov. 23, 2015.
European Search Report for Application No. 13778019.3 dated Dec. 14, 2015.
Chinese Office Action and partial English translation thereof, dated Jul. 18, 2016, for Chinese Application No. 201380010405.7.
European Search Report for Application No. 13777711.6 dated Aug. 17, 2015.
European Search Report for Application No. 13777711.6 dated Feb. 1, 2016.

* cited by examiner

[FIG. 1]
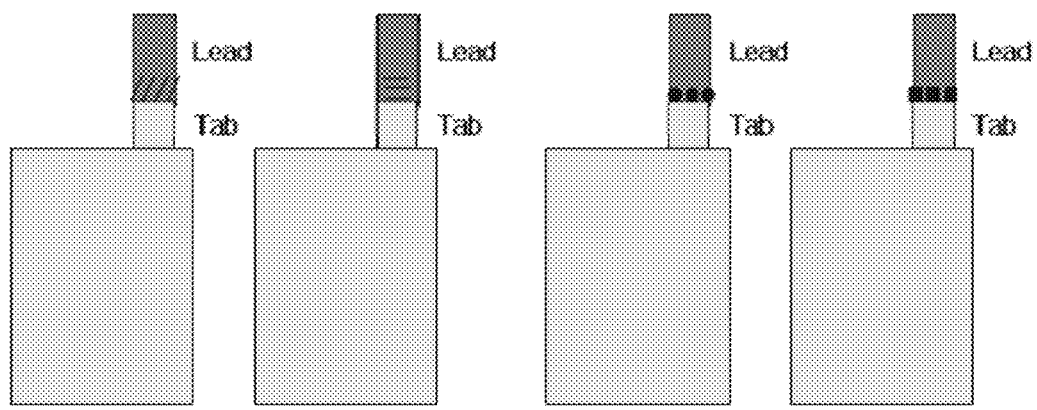

[FIG. 2]
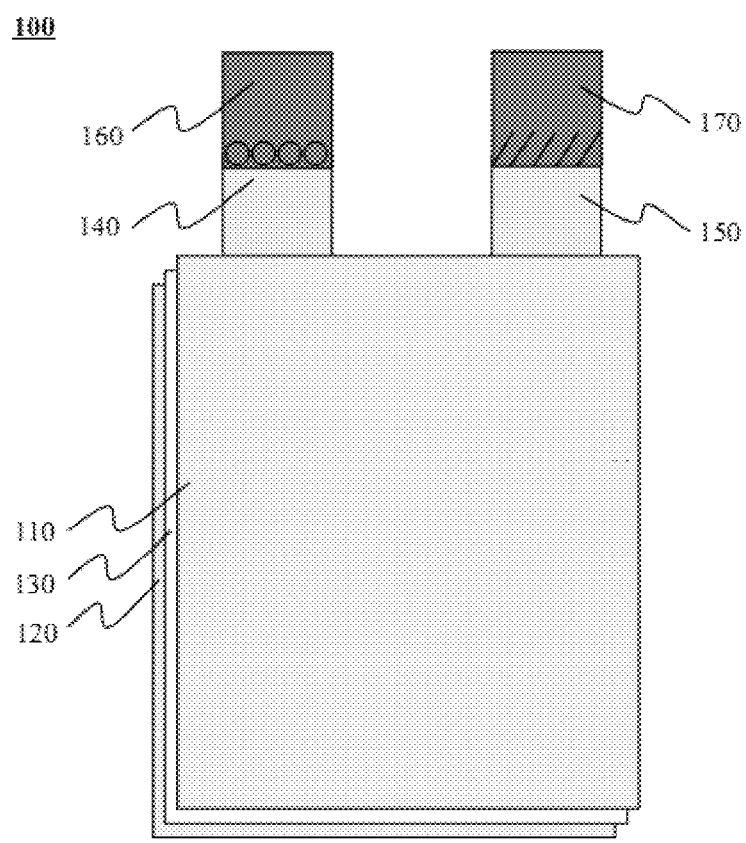

[FIG. 3]
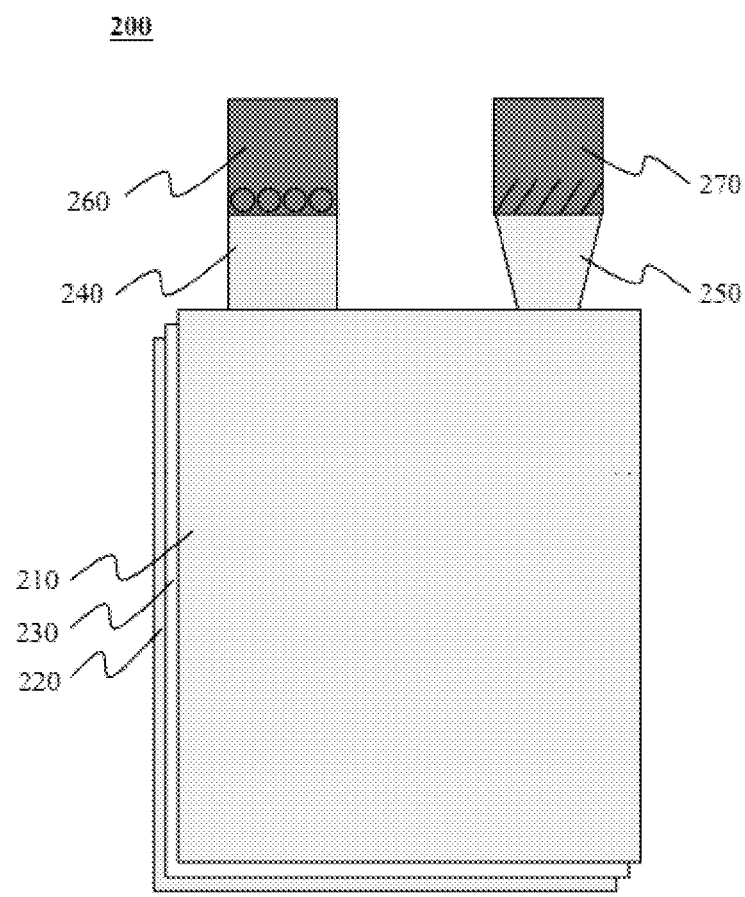

【FIG. 4】
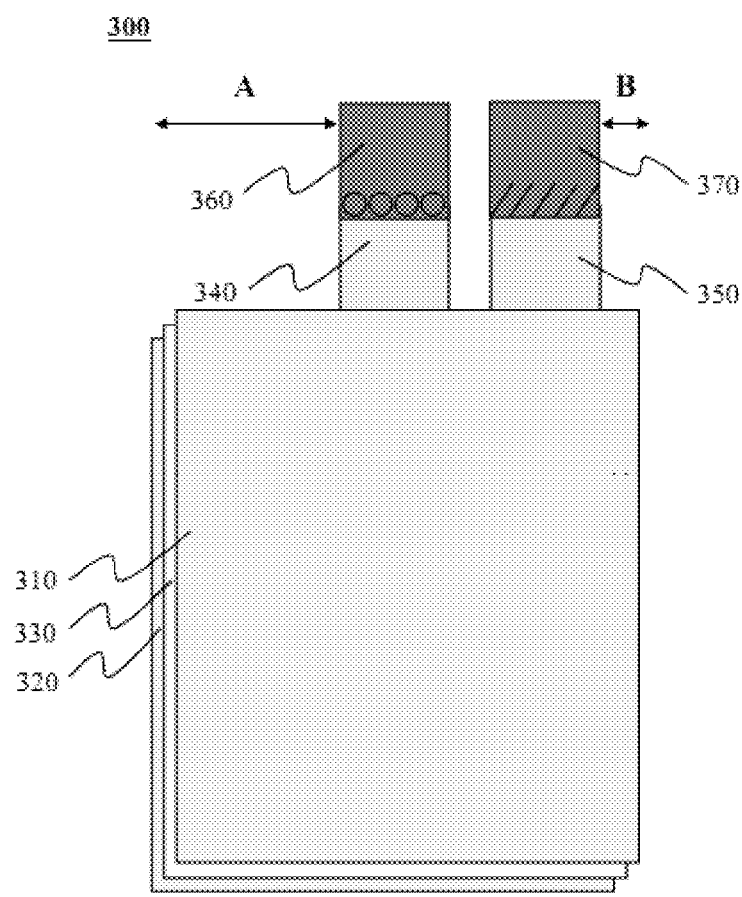

[FIG. 5]
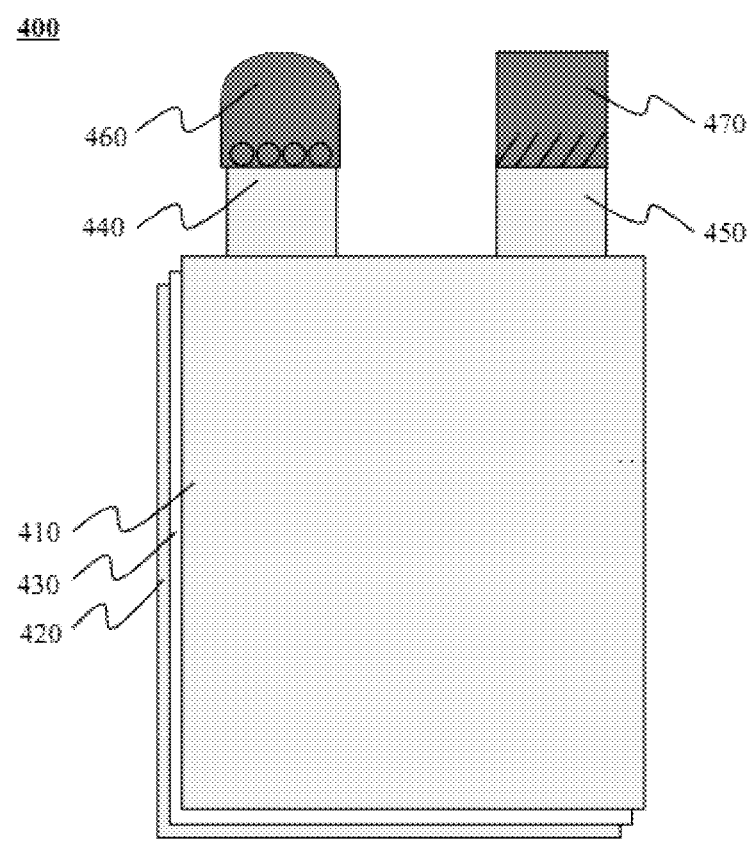

[FIG. 6]
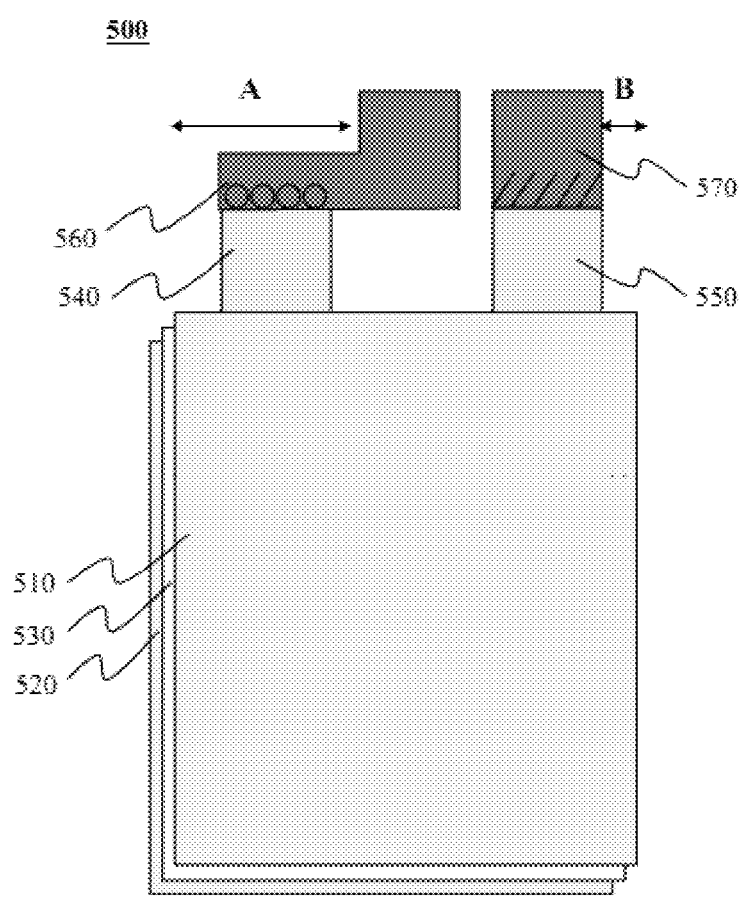

[FIG. 7]
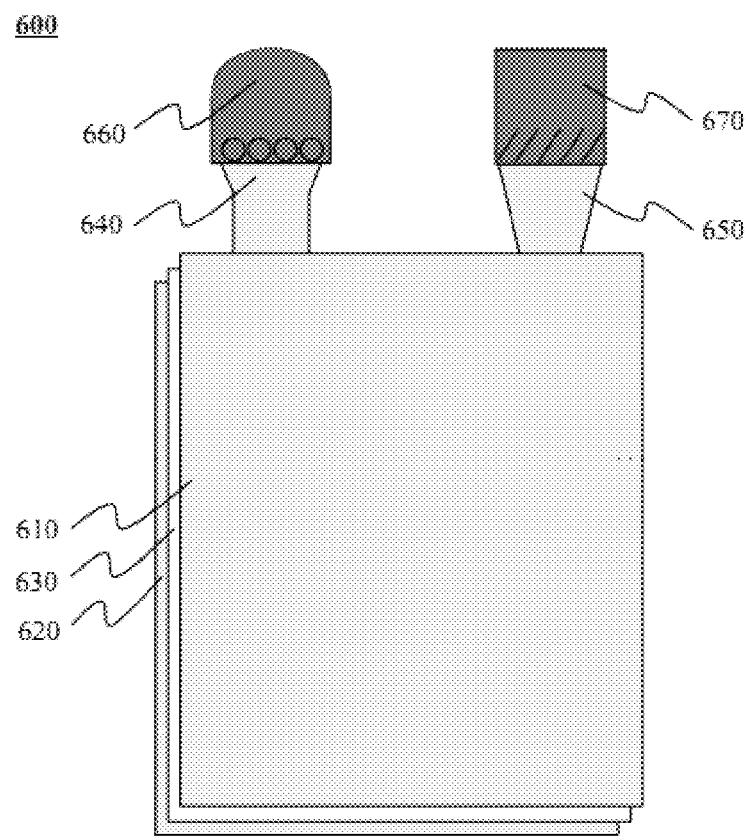

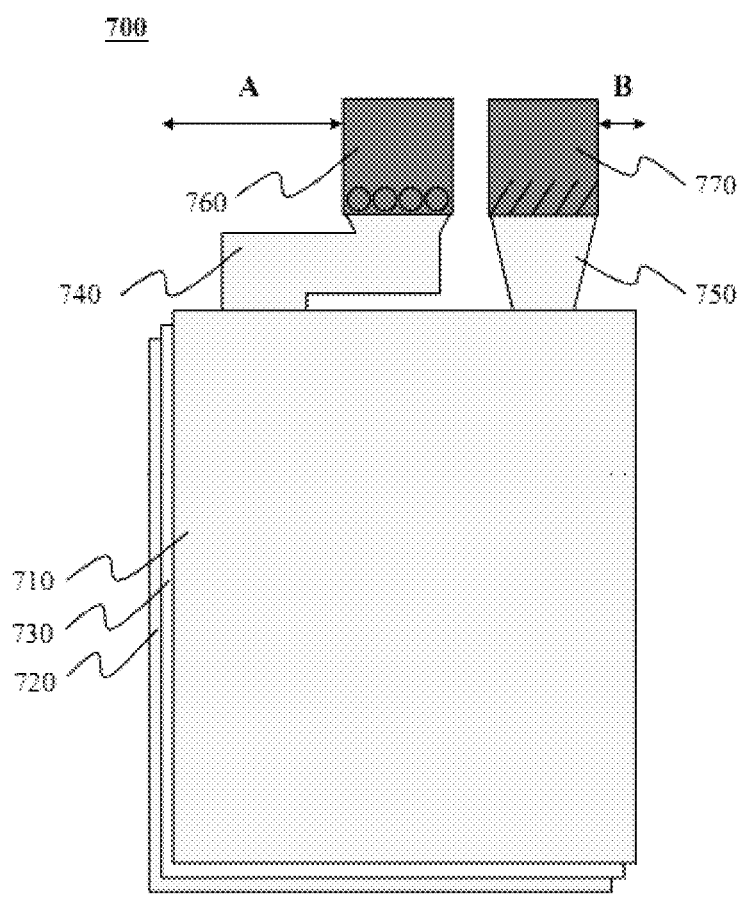
[FIG. 8]

[FIG. 9]
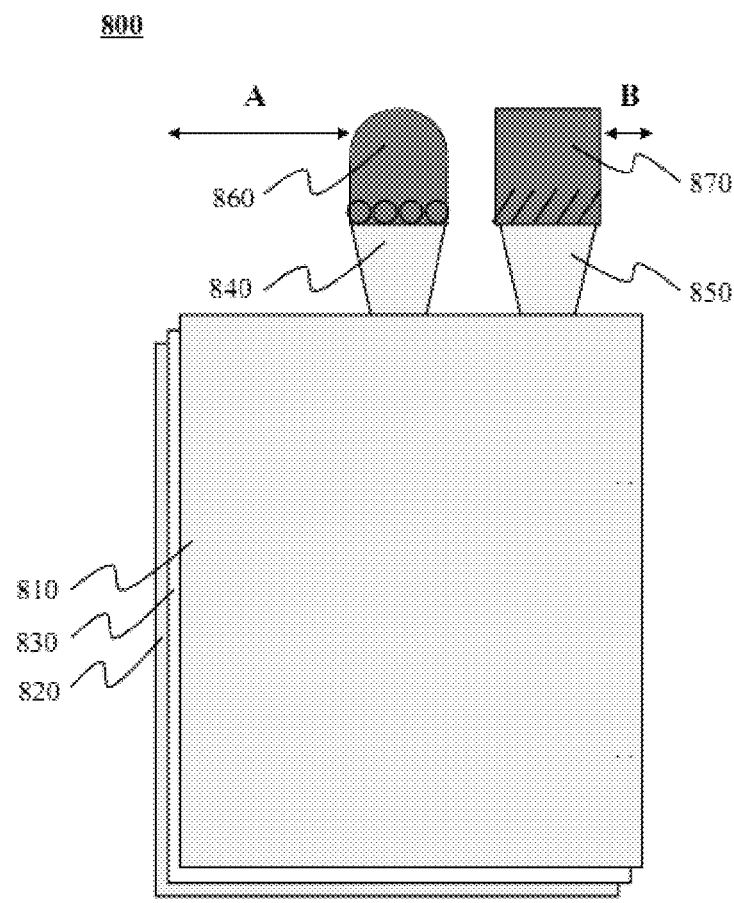

[FIG. 10]
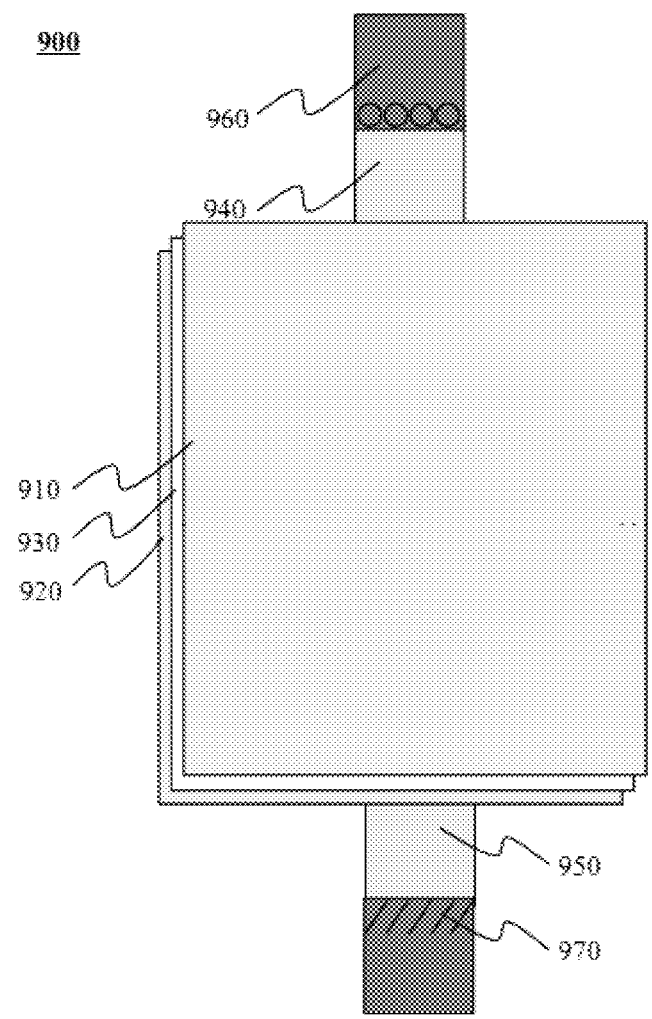

[FIG. 11]
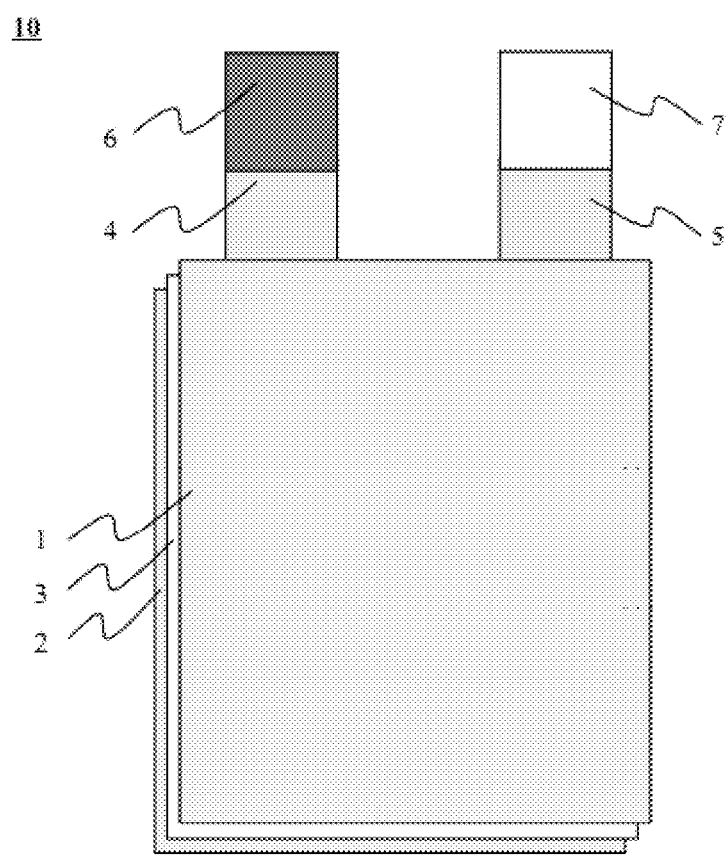

_ELECTRODE ASSEMBLY INCLUDING CATHODE AND ANODE HAVING DIFFERENT WELDING PORTION SHAPES AND SECONDARY BATTERY INCLUDING THE SAME_

CROSS REFERENCE TO RELATED APPLICATIONS

This application is a Continuation of PCT International Application No. PCT/KR2013/003200, filed on Apr. 16, 2013, which claims priority under 35 U.S.C. 119(a) to Patent Application No. 10-2012-0039327, Patent Application No. 10-2012-0039246, and Patent Application No. 10-2012-0039351, filed in the Republic of Korea on Apr. 16, 2012, all of which are hereby expressly incorporated by reference into the present application.

TECHNICAL FIELD

The present invention relates to an electrode assembly including a cathode and an anode having different welding portion shapes and a secondary battery including the same and, more particularly, to an electrode assembly including a plurality of alternately arranged cathode and anode plates; a separator interposed between the cathode plate and the anode plate; a plurality of cathode tabs respectively formed on the cathode plates; a plurality of anode tabs respectively formed on the anode plates; a cathode lead coupled to the cathode tabs; and an anode lead coupled to the anode tabs, wherein the welding portions in which the cathode and anode tabs are respectively coupled to the cathode and anode leads have different shapes, or kinds of the cathode and anode tabs are identical and kinds of the cathode and anode leads are different.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

A lithium secondary battery has a structure in which an electrode assembly, in which a porous separator is interposed between a cathode and an anode, each of which includes an active material coated on a current collector, is impregnated with a lithium salt-containing non-aqueous electrolyte. As cathode active materials, lithium cobalt-based oxides, lithium manganese-based oxides, lithium nickel-based oxides, lithium composite oxides, and the like are mainly used. As anode active materials, carbon-based materials are mainly used.

However, in lithium secondary batteries using carbon-based materials as an anode active material, irreversible capacity occurs in some lithium ions intercalated into a layered structure of a carbon-based material during a $1^{st}$ charging and discharging cycle and thus discharge capacity is reduced. In addition, carbon materials have a low oxidation/reduction potential of about 0.1 V with respect to potential of $Li/Li^+$ and thus a non-aqueous electrolyte decomposes at an anode surface and such carbon materials react with lithium to form a layer coated on a surface of a carbon material (a passivating layer or a solid electrolyte interface (SEI) film). The thickness and boundary states of such an SEI film vary according to an electrolyte system used and thus affect charge and discharge characteristics. In addition, in secondary batteries used in fields that require high output characteristics, such as power tools and the like, resistance increases due to such an SEI film having a small thickness and thus a rate determining step (RDS) may occur. In addition, a lithium compound is produced at an anode surface and thus, as charging and discharging are repeated, reversible capacity of lithium gradually decreases and, accordingly, discharge capacity is reduced and cycle deterioration occurs.

Meanwhile, as an anode material having structural stability and good cycle characteristics, use of lithium titanium oxides (LTOs) is under consideration. In lithium secondary batteries including such LTOs as an anode active material, an anode has a relatively high oxidation/reduction potential of about 1.5 V with respect to potential of $Li/Li^+$ and thus decomposition of an electrolyte hardly occurs and excellent cycle characteristics are obtained due to stability of a crystal structure thereof.

In addition, existing anode active materials are used by coating onto Cu foil, while an LTO may be used as an anode active material by coating onto Al foil.

However, it is difficult to distinguish a cathode including a cathode active material coated on Al foil from an LTO anode with the naked eye. In addition, Al lead can also be used and, accordingly, the LTO anode is mistaken for a cathode and thus positions of a cathode and an anode may be confused during module assembly or wiring for electrical connection.

Therefore, there is an urgent need to develop technology for fundamentally meeting such requirements.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a cathode and an anode have different welding shapes or kinds of cathode and anode leads are different, desired effects may be obtained, thus completing the present invention.

Technical Solution

In accordance with one aspect of the present invention, provided is an electrode assembly including: a plurality of alternately arranged cathode and anode plates; a separator interposed between the cathode plate and the anode plate; a plurality of cathode tabs respectively formed on the cathode plates; a plurality of anode tabs respectively formed on the anode plates; a cathode lead coupled to the cathode tabs; and an anode lead coupled to the anode tabs, wherein welding portions in which the cathode and anode tabs are respectively coupled to the cathode and anode leads have different shapes.

In a battery in which a plurality of electrode plates is electrically connected to constitute an electrode assembly, electrical connection is generally configured such that a plurality of electrode tabs protruding from the electrode plates is coupled to a single electrode lead. In the present invention, welding portions between electrode tabs and an electrode lead of a cathode and an anode have different shapes and thus it may be easy to distinguish the cathode from the anode.

The shapes of the welding portions are not particularly limited so long as they enable the cathode to be distinguished from the anode. For example, when viewed in plan view, examples of the shapes include, but are not limited to, at least one straight line parallel to an upper end of the electrode plate, at least one straight line perpendicular to the upper end of the electrode plate, at least one oblique line inclined at a predetermined angle with respect to the upper end of the electrode plate, at least one circular shape, and at least one polygonal shape.

When the welding portion shape is at least one oblique line inclined at a predetermined angle with respect to the upper end of the electrode plate, the oblique line may be inclined at an angle of greater than 0° to less than 90°, particularly 10° to 80°, more particularly 30° to 60°.

Materials constituting the cathode and anode tabs and the cathode and anode leads may be different and, particularly, may be identical, for example, Al.

The present invention also provides an electrode assembly including: a plurality of alternately arranged cathode and anode plates; a separator interposed between the cathode plate and the anode plate; a plurality of cathode tabs respectively formed on the cathode plates; a plurality of anode tabs respectively formed on the anode plates; a cathode lead coupled to the cathode tabs; and an anode lead coupled to the anode tabs, wherein kinds of the cathode tabs and the anode tabs are identical and kinds of the cathode lead and the anode lead are different.

In a specific embodiment, the kinds of the electrode tabs are not limited and, particularly, the electrode tabs may be made of Al. The kinds of the cathode lead and the anode lead are not limited and, for example, one thereof may be a Ni lead and the other thereof may be an Al lead.

Positions of the cathode tabs and the anode tabs are not limited. For example, when manufacturing the electrode assembly, the cathode tabs and the anode tabs may be positioned at an end portion in a lateral direction of the electrode assembly, respectively positioned on opposite end portions of the electrode assembly facing each other, or respectively positioned on end portions of the electrode assembly perpendicular to each other, when viewed in plan view.

Meanwhile, when the welding portions have different shapes or the kinds of the cathode and anode leads are different, it is possible to distinguish a cathode from an anode during module assembly or wiring for electrical connection. However, in a case in which the cathode lead and the anode lead are respectively welded to the cathode tabs and the anode tabs, when the cathode tabs and the anode tabs are made of the same material, it is difficult to distinguish the cathode tabs from the anode tabs with the naked eye and thus there is a high possibility of cross-welding.

Thus, to address the problems described above, in a specific embodiment, the cathode tabs and the anode tabs may have different shapes or may be asymmetrically positioned with respect to the electrode surfaces.

Shapes of the cathode tabs and the anode tabs are not particularly limited so long as the cathode tabs are distinguished from the anode tabs. For example, the cathode tabs and the anode tabs may have different polygonal shapes, any one kind thereof may have a shape with an arc end portion, or the cathode and anode tabs may have bent shapes such that the cathode and anode leads are asymmetrically positioned with respect to the electrode surfaces. Moreover, to facilitate welding, the cathode and anode tabs may have a trapezoidal shape, an upwardly tapered funnel shape, a sector shape, a mushroom shape, or the like, so that the welding portions of the cathode and anode tabs have a wide width.

The expression "the cathode tabs and the anode tabs are asymmetrically positioned with respect to electrode surfaces" as used herein means that the cathode tabs and the anode tabs are asymmetrically biased with respect to an axis passing through a center of the electrode assembly, i.e., central points of the electrode surfaces, in the up and down direction.

Due to this configuration, for example, assuming that the electrode assembly is folded in half when the electrode tabs are asymmetrically positioned, the electrode tabs do not overlap each other.

In an embodiment, the cathode tabs and the anode tabs may be formed such that, when manufacturing the electrode assembly, the cathode tabs are positioned on longer electrode surfaces than electrode surfaces on which the anode tabs are formed, or the anode tabs are positioned on longer electrode surfaces than electrode surfaces on which the cathode tabs are formed.

Although the object of the present invention may be completely achieved by the above-described configuration, in a specific embodiment, the cathode and anode leads may have different shapes or be asymmetrically positioned with respect to the electrode surfaces, to more easily distinguish a cathode from an anode.

The shapes of the cathode and anode leads are not particularly limited. For example, the cathode and anode leads may have different polygonal shapes or any one thereof may have a shape with an arc end portion.

A method of asymmetrically positioning the cathode and anode leads with respect to the electrode surfaces is not particularly limited. For example, such configuration may be achieved such that the cathode lead or the anode lead may have a bent shape or, as described above, two kinds of electrode tabs may be asymmetrically positioned.

Widths of the electrode tabs and the electrode lead at welding portions thereof may be identical or may be different such that the electrode tabs have a greater width than that of the electrode lead or the electrode lead has a greater width than that of the electrode tabs. In this regard, in a case in which the electrode tabs and the electrode lead have different widths, when a pouch is used as a battery case, the pouch may be torn and thus, in this case, edge portions thereof may be wound by an insulating tape or the like.

Hereinafter, other components of the electrode assembly will be described.

The cathode plate is manufactured by coating a mixture of a cathode active material, a conductive material, and a binder on a cathode current collector and drying and pressing the coated cathode current collector. As desired, the mixture may further include a filler.

The cathode current collector is generally fabricated to a thickness of 3 to 500 μm. The cathode current collector is not particularly limited so long as it does not cause chemical changes in the fabricated battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

Examples of the cathode active material may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; spinel-structure lithium manganese composite oxides having the formula $LiNi_xMn_{2-x}O_4$ where $0.01 \leq x \leq 0.6$; $LiMn_2O_4$ where some of the Li atoms are substituted with alkaline earth metal ions; disulfide compounds; and $Fe_2(MoO_4)_3$.

In a specific embodiment, the cathode active material may be a spinel-structure lithium manganese composite oxide, which is a high-potential oxide, represented by Formula 1 below:

$$Li_xM_yMn_{2-y}O_{4-z}A_z \quad (1)$$

wherein $0.9 \leq x \leq 1.2$, $0 < y < 2$, and $0 \leq z \leq 0.2$;

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

In particular, the lithium manganese composite oxide may be a lithium nickel manganese composite oxide represented by Formula 2 below, more particularly $LiNi_{0.5}Mn_{1.5}O_4$ or $LiNi_{0.4}Mn_{1.6}O_4$.

$$Li_xNi_yMn_{2-y}O_4 \quad (2)$$

In Formula 2 above, $0.9 \leq x \leq 1.2$ and $0.4 \leq y \leq 0.5$.

In another embodiment, the cathode active material may be at least one of oxides represented by Formulas 3 and 4, in particular at least one oxide selected from the group consisting of $LiNi_{1/3}Mn_{1/3}Co_{1/3}O_2$, $LiNi_{0.6}Co_{0.2}Mn_{0.2}O_2$, $LiNi_{0.8}Co_{0.1}Mn_{0.1}O_2$, and $LiMn_2O_4$.

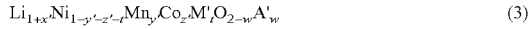

$$Li_{1+x'}Ni_{1-y'-z'-t}Mn_{y'}Co_{z'}M'_tO_{2-w'}A'_{w'} \quad (3)$$

wherein $-0.2 < x' < 0.2$, $0 \leq y' \leq 0.4$, $0 \leq z' \leq 0.4$, $0 \leq t \leq 0.2$, and $0 \leq w' \leq 0.05$; M'=a first row transition metal such as Fe, Cr, Ti, Zn, V, or the like, Al, Mg, or the like; A'=Groups 6A and 7A elements such as S, Se, F, Cl, I, and the like, and

$$Li_{1+x''}Mn_{2-y''}M''_{y''}O_{4-w''}A''_{w''} \quad (4)$$

wherein $-0.2 < x'' < 0.2$, $0 \leq y'' < 0.4$, and $0 \leq w'' \leq 0.05$; M''=a first row transition metal such as Ni, Mn, Fe, Cr, Ti, Zn, V, or the like; and A''=Groups 6A and 7A elements such as S, Se, F, Cl, I, and the like.

The conductive material is typically added in an amount of 1 to 50 wt % based on the total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The anode binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The anode plate is manufactured by coating an anode active material on an anode current collector and drying and pressing the coated anode current collector. As desired, the above-described components such as a conductive material, a binder, a filler, and the like may be further used in addition to the anode active material.

The anode current collector is generally fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, silver, or the like, or aluminum-cadmium alloys. Similar to the cathode current collector, the anode current collector may also have fine irregularities at a surface thereof to increase adhesion between the anode active material and the anode current collector. In addition, the anode current collector may be used in any of various forms including films, sheets, foils, nets, porous structures, foams, and non-woven fabrics.

Examples of the anode active material include, but are not limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me':Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; titanium oxides; lithium titanium oxides.

In a specific embodiment, the anode active material may be a lithium titanium oxide (LTO) represented by Formula 5 below, in particular $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$, or the like. However, composition and kind of the anode active material are not particularly limited so long as the anode active material is capable of intercalating/deintercalating lithium ions. More particularly, the anode active material may be a spinel-structure LTO that undergoes small change in crystal structure during charge and discharge and has excellent reversibility, such as $Li_{1.33}Ti_{1.67}O_4$ or $LiTi_2O_4$.

$$Li_aTi_bO_4 \quad (5)$$

wherein $0.5 \leq a \leq 3$ and $1 \leq b \leq 2.5$.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The present invention also provides a secondary battery including the electrode assembly described above. In particular, the present invention provides a secondary battery having a structure in which the electrode assembly is impregnated with a lithium salt-containing electrolyte.

The lithium salt-containing electrolyte is composed of an electrolyte and a lithium salt. As the electrolyte, a non-aqueous organic solvent, an organic solid electrolyte, an inorganic solid electrolyte, or the like may be used, but embodiments of the present invention are not limited thereto.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte. Examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In a specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent of a cyclic carbonate such as EC or PC, which is a high dielectric solvent, and a linear carbonate such as DEC, DMC, or EMC, which is a low-viscosity solvent.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates partial plan views of electrode assemblies according to various embodiments of the present invention to show shapes of welding portions;

FIG. 2 is a view of an electrode assembly according to an embodiment of the present invention;

FIG. 3 is a view of an electrode assembly according to another embodiment of the present invention;

FIG. 4 is a view of an electrode assembly according to another embodiment of the present invention;

FIG. 5 is a view of an electrode assembly according to another embodiment of the present invention;

FIG. 6 is a view of an electrode assembly according to another embodiment of the present invention;

FIG. 7 is a view of an electrode assembly according to another embodiment of the present invention;

FIG. 8 is a view of an electrode assembly according to another embodiment of the present invention;

FIG. 9 is a view of an electrode assembly according to another embodiment of the present invention;

FIG. 10 is a view of an electrode assembly according to another embodiment of the present invention; and FIG. 11 is a view of an electrode assembly according to another embodiment of the present invention.

MODE FOR INVENTION

Now, the present invention will be described in more detail with reference to the accompanying drawings. These examples are provided for illustrative purposes only and should not be construed as limiting the scope and spirit of the present invention.

FIG. 1 illustrates partial plan views of electrode assemblies according to various embodiments of the present invention to show shapes of welding portions.

Referring to FIG. 1, a first partial plan view illustrates that welding portions in which electrode tabs are coupled to an electrode lead have a shape having a plurality of oblique lines inclined at about 45° with respect to an upper end of an electrode plate.

A second partial plan view illustrates that welding portions have a shape having a plurality of straight lines parallel to an upper end of an electrode plate. A third partial plan view illustrates that welding portions have a shape having a plurality of circles. A fourth partial plan view illustrates that welding portions have a shape having a plurality of squares.

The shapes of these welding portions may be distinguished with the naked eye. For example, when manufacturing an electrode assembly configured such that a welding portion of a cathode plate has the shape illustrated in the first view and a welding portion of an anode plate has one of the shapes illustrated in the second, third and fourth views, it may be easy to distinguish cathode plates from anode plates.

FIGS. 2 to 10 are views respectively illustrating electrode assemblies 100, 200, 300, 400, 500, 600, 700, 800 and 900 according to embodiments of the present invention.

The electrode assemblies 100, 200, 300, 400, 500, 600, 700, 800 and 900 respectively include stacked structures including cathode plates 110, 210, 310, 410, 510, 610, 710, 810 and 910 from which cathode tabs 140, 240, 340, 440, 540, 640, 740, 840 and 940 protrude, anode plates 120, 220, 320, 420, 520, 620, 720, 820 and 920 from which anode tabs 150, 250, 350, 450, 550, 650, 750, 850 and 950 protrude, and separators 130, 230, 330, 430, 530, 630, 730, 830 and 930 disposed between the cathode plates 110, 210, 310, 410, 510, 610, 710, 810 and 910 and the anode plates 120, 220, 320, 420, 520, 620, 720, 820 and 920, cathode leads 160, 260, 360, 460, 560, 660, 760, 860 and 960 coupled to the cathode tabs 140, 240, 340, 440, 540, 640, 740, 840 and 940, and anode leads 170, 270, 370, 470, 570, 670, 770, 870 and 970 coupled to the anode tabs 150, 250, 350, 450, 550, 650, 750, 850 and 950. In this regard, welding portions in which the cathode tabs 140, 240, 340, 440, 540, 640, 740, 840 and 940 are respectively coupled to the cathode leads 160, 260, 360, 460, 560, 660, 760, 860 and 960 have at least one circular shape, and welding portions in which the anode tabs 150, 250, 350, 450, 550, 650, 750, 850 and 950 are respectively coupled to the anode leads 170, 270, 370, 470, 570, 670, 770, 870 and 970 have a shape having at least one oblique line inclined at a predetermined angle. Thus, due to the different welding shapes, it is easy to respectively distinguish the cathode leads 160, 260, 360, 460, 560, 660, 760, 860 and 960 from the anode leads 170, 270, 370, 470, 570, 670, 770, 870 and 970 during module assembly or wiring for electrical connection.

In particular, first, referring to FIG. 2, when viewed in plan view, the cathode and anode tabs 140 and 150 and the cathode and anode leads 160 and 170 have the same shape, i.e., a rectangular shape and the cathode and anode tabs 140 and 150 have different welding shapes. Thus, due to such shape, it is possible to distinguish the cathode lead 160 from the anode lead 170.

Referring to FIG. 3, when viewed in plan view, the cathode tab 240 has a rectangular shape and the anode tab 250 has a trapezoidal shape. Referring to FIG. 4, the cathode and anode tabs 340 and 350 have the same shape, while being asymmetrically (A≠B) positioned. Thus, it is easy to distinguish the cathode tabs 240 and 340 from the anode tabs 250 and 350 and thus cross-welding may be prevented.

Referring to FIG. 5, when viewed in plan view, the cathode lead 460 has a shape with an arc end portion and the anode lead 470 has a rectangular shape. Referring to FIG. 6, when viewed in plan view, the cathode lead 560 has a bent shape and the anode lead 570 has a rectangular shape. Due to the bent shape of the cathode lead 560, the cathode lead 560 and the anode lead 570 are asymmetrically (A≠B) positioned such that the cathode and anode leads 560 and 570 have different distances from an axis passing through the center of the electrode in the up and down direction. Thus, it is further easy to distinguish the cathode leads 460 and 560 from the anode leads 470 and 570.

Referring to FIG. 7, when viewed in plan view, the cathode tab 640 has an upwardly tapered funnel shape and the anode tab 650 has a trapezoidal shape. Thus, it is easy to distinguish the cathode tab 640 from the anode tab 650. In addition, the cathode tab 640 and the anode tab 650 have a shape such that portions of the cathode and anode tabs 640 and 650 respectively facing cathode and anode leads 660 and 670 have wider average widths than those of portions thereof facing electrode surfaces and thus welding between the respective cathode and anode tabs 640 and 650 and the respective leads 660 and 670 is also easy.

In addition, when viewed in plan view, the cathode lead 660 has a shape with an arc end portion and the anode lead 670 has a rectangular shape and thus, due to the different in welding shapes, it is further easy to distinguish the cathode lead 660 from the anode lead 670.

Referring to FIG. 8, when viewed in plan view, the cathode tab 740 has a bent shape and the anode tab 750 has a trapezoidal shape. Thus, it is easy to distinguish the cathode tab 740 from the anode tab 750. In addition, the cathode tab 740 and the anode tab 750 have a shape such that portions of the cathode and anode tabs 740 and 750 respectively facing cathode and anode leads 760 and 770 have wider average widths than those of portions thereof facing electrode surfaces and thus welding between the respective cathode and anode tabs 740 and 750 and the respective leads 760 and 770 is also easy.

In this regard, while the cathode lead 760 and the anode lead 770 have the same shape, due to the shape of the cathode tab 740, the cathode lead 760 and the anode lead 770 are asymmetrically (A≠B) positioned such that the cathode and anode leads 760 and 770 have different distances from an axis passing through the center of the electrode in the up and down direction. Thus, it is also easy to distinguish the cathode lead 760 from the anode lead 770.

Referring to FIG. 9, the cathode and anode tabs 840 and 850 have the same shape, while being asymmetrically (A≠B) positioned. Thus, it is easy to distinguish the cathode tab 840 from the anode tab 850. In addition, the cathode tab 840 and the anode tab 850 have a shape such that portions of the cathode and anode tabs 840 and 850 respectively facing cathode and anode leads 860 and 870 have wider average widths than those of portions thereof facing electrode surfaces and thus welding between the respective cathode and anode tabs 840 and 850 and the respective leads 860 and 870 is also easy.

In this regard, when viewed in plan view, the cathode lead 860 has a shape with an arc end portion and the anode lead 870 has a rectangular shape and thus, in addition to the difference in welding shapes, it may be easy to distinguish the cathode lead 860 from the anode lead 870.

Meanwhile, referring to FIG. 10, when manufacturing the electrode assembly 900, the cathode tab 940 and the anode tab 950 are respectively positioned on opposite end portions of the electrode assembly 900 facing each other. In this case, as illustrated in FIG. 2, a welding portion in which the cathode tab 940 is coupled to the cathode lead 960 has at least one circular shape and a welding portion in which the anode tab 950 is coupled to the anode lead 970 has a shape having at least one oblique line inclined at a predetermined angle and thus it may be easy to distinguish the cathode lead 960 from the anode lead 970.

FIG. 11 is a view of an electrode assembly 10 according to another embodiment of the present invention.

Referring to FIG. 11, the electrode assembly 10 includes a stacked structure including a cathode plate 1 from which a cathode tab 4 protrudes, an anode plate 2 from which an anode tab 5 protrudes, and a separator 3 disposed between the cathode plate 1 and the anode plate 2, a cathode lead 6 coupled to the cathode tab 4, and an anode lead 7 coupled to the anode tab 5. In this regard, kinds of the cathode lead 6 and the anode lead 7 are different and thus it is easy to distinguish the cathode lead 6 from the anode lead 7 during module assembly or wiring for electrical connection.

As such, even when kinds of cathode and anode leads are different, the configurations described above, i.e., when shapes and positions of cathode and anode tabs are different and shapes and positions of cathode and anode leads are different, may also be applied.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, in an electrode assembly according to the present invention, cathode and anode tabs have different welding shapes or kinds of cathode and anode leads are different and thus confusion of the positions of a cathode and an anode during module assembly or wiring for electrical connection may be addressed. Accordingly, short-circuit, which may occur because a cathode and an anode are simultaneously connected in the wrong manner during module assembly or overdischarge or overcharge, which may occur due to application of a voltage between a cathode and an anode in the opposite direction, may be prevented.

In addition, when shapes or positions of cathode tabs and anode tabs are different, cross-welding may also be prevented.

The invention claimed is:

1. An electrode assembly comprising:
   a plurality of alternately arranged cathode and anode plates;
   a separator disposed between the cathode plate and the anode plate;
   a plurality of cathode tabs respectively formed on the cathode plates;
   a plurality of anode tabs respectively formed on the anode plates;
   a cathode lead coupled to the cathode tabs; and
   an anode lead coupled to the anode tabs,
   wherein a welding mark joining the cathode tab to the cathode lead has a different shape than a welding mark joining the anode tab to the anode lead, and
   wherein materials constituting the cathode tabs and the anode tabs are identical.

2. The electrode assembly according to claim 1, wherein the welding mark of the cathode tab is at least one straight line parallel to an upper end of an electrode plate when viewed in plan view and the welding mark of the anode tab is at least one circle when viewed in plan view.

3. The electrode assembly according to claim 1, wherein the welding mark of the anode tab is at least one straight line perpendicular to an upper end of an electrode plate when viewed in plan view and the welding mark of the cathode tab is at least one circle when viewed in plan view.

4. The electrode assembly according to claim 1, wherein the welding mark of the anode tab is at least one oblique line inclined at a predetermined angle with respect to an upper end of an electrode plate and wherein the welding mark of the cathode tab is at least one circle when viewed in plan view.

5. The electrode assembly according to claim 1, wherein the welding mark of the cathode tab is at least one oblique line inclined at a predetermined angle with respect to an upper end of an electrode plate and the welding mark of the anode tab is at least one circle when viewed in plan view.

6. The electrode assembly according to claim 1, wherein the welding marks of the cathode and anode tabs are at least one polygon when viewed in plan view.

7. The electrode assembly according to claim 1, wherein materials constituting the cathode and anode leads are identical.

8. The electrode assembly according to claim 1, wherein the cathode tabs and the anode tabs have different shapes or are asymmetrically positioned with respect to an electrode surface.

9. The electrode assembly according to claim 1, wherein the cathode lead and the anode lead have different shapes or are asymmetrically positioned with respect to an electrode surface.

10. The electrode assembly according to claim 1, wherein the cathode tabs and the anode tabs have different shapes or are asymmetrically positioned with respect to an electrode surface, and the cathode lead and the anode lead have different shapes or are asymmetrically positioned with respect to the electrode surface.

11. A secondary battery comprising the electrode assembly according to claim 1.

12. The electrode assembly according to claim 1, wherein the cathode plate comprises, as a cathode active material, at least one of oxides represented by Formulas 3 and 4:

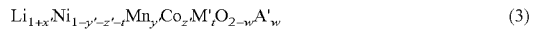
$$Li_{1+x'}Ni_{1-y'-z'-t}Mn_{y'}Co_{z'}M'_{t}O_{2-w}A'_{w} \quad (3)$$

wherein $-0.2<x'<0.2$, $0\leq y'\leq 0.4$, $0\leq z'\leq 0.4$, $0\leq t\leq 0.2$, and $0\leq w\leq 0.05$; M'=a first row transition metal such as Fe, Cr, Ti, Zn, V, or the like, Al, Mg, or the like; A'=Groups 6A and 7A elements such as S, Se, F, Cl, I, and the like, and

$$Li_{1+x''}Mn_{2-y''}M''_{y''}O_{4-w'}A''_{w'} \quad (4)$$

wherein $-0.2<x''<0.2$, $0\leq y''<0.4$, and $0\leq w'\leq 0.05$; M''=a first row transition metal such as Ni, Mn, Fe, Cr, Ti, Zn, V, or the like; and A''=Groups 6A and 7A elements such as S, Se, F, Cl, I, and the like.

13. The electrode assembly according to claim 12, wherein the cathode active material is at least one oxide selected from the group consisting of $LiNi_{1/3}Mn_{1/3}Co_{1/3}O_2$, $LiNi_{0.6}Co_{0.2}Mn_{0.2}O_2$, $LiNi_{0.8}Co_{0.1}Mn_{0.1}O_2$, and $LiMn_2O_4$.

14. The electrode assembly according to claim 1, wherein the anode plate comprises, as an active material, a lithium titanium oxide (LTO) represented by Formula 5 below:

$$Li_aTi_bO_4 \quad (5)$$

wherein $0.5\leq a\leq 3$ and $1\leq b\leq 2.5$.

15. The electrode assembly according to claim 14, wherein the lithium titanium oxide is $Li_{1.33}Ti_{1.67}O_4$ or $LiTi_2O_4$.

16. The electrode assembly according to claim 1, wherein the cathode plate comprises, as an active material, a spinel-structure lithium manganese composite oxide represented by Formula 1 below:

$$Li_xM_yMn_{2-y}O_{4-z}A_z \quad (1)$$

wherein $0.9\leq x\leq 1.2$, $0<y<2$, and $0\leq z<0.2$;

M is at least one element selected from the group consisting of Al, Mg, Ni, Co, Fe, Cr, V, Ti, Copper, B, Ca, Zn, Zr, Nb, Mo, Sr, Sb, W, Ti, and Bi; and A is at least one monovalent or divalent anion.

17. The electrode assembly according to claim 16, wherein the lithium manganese composite oxide of Formula 1 is a lithium nickel manganese composite oxide (LNMO) represented by Formula 2 below:

$$LiNi_xMn_{2-y}O_4 \quad (2)$$

wherein $0.9 \leq x \leq 1.2$ and $0.4 \leq y \leq 0.5$.

18. The electrode assembly according to claim 17, wherein the lithium nickel manganese composite oxide of Formula 2 is $LiNi_{0.5}Mn_{1.5}O_4$ or $LiNi_{0.4}Mn_{1.6}O_4$.

* * * * *